March 24, 1931.  E. L. HATCHER  1,797,417
ICE CREAM DISPENSING
Filed April 17, 1925   3 Sheets-Sheet 1
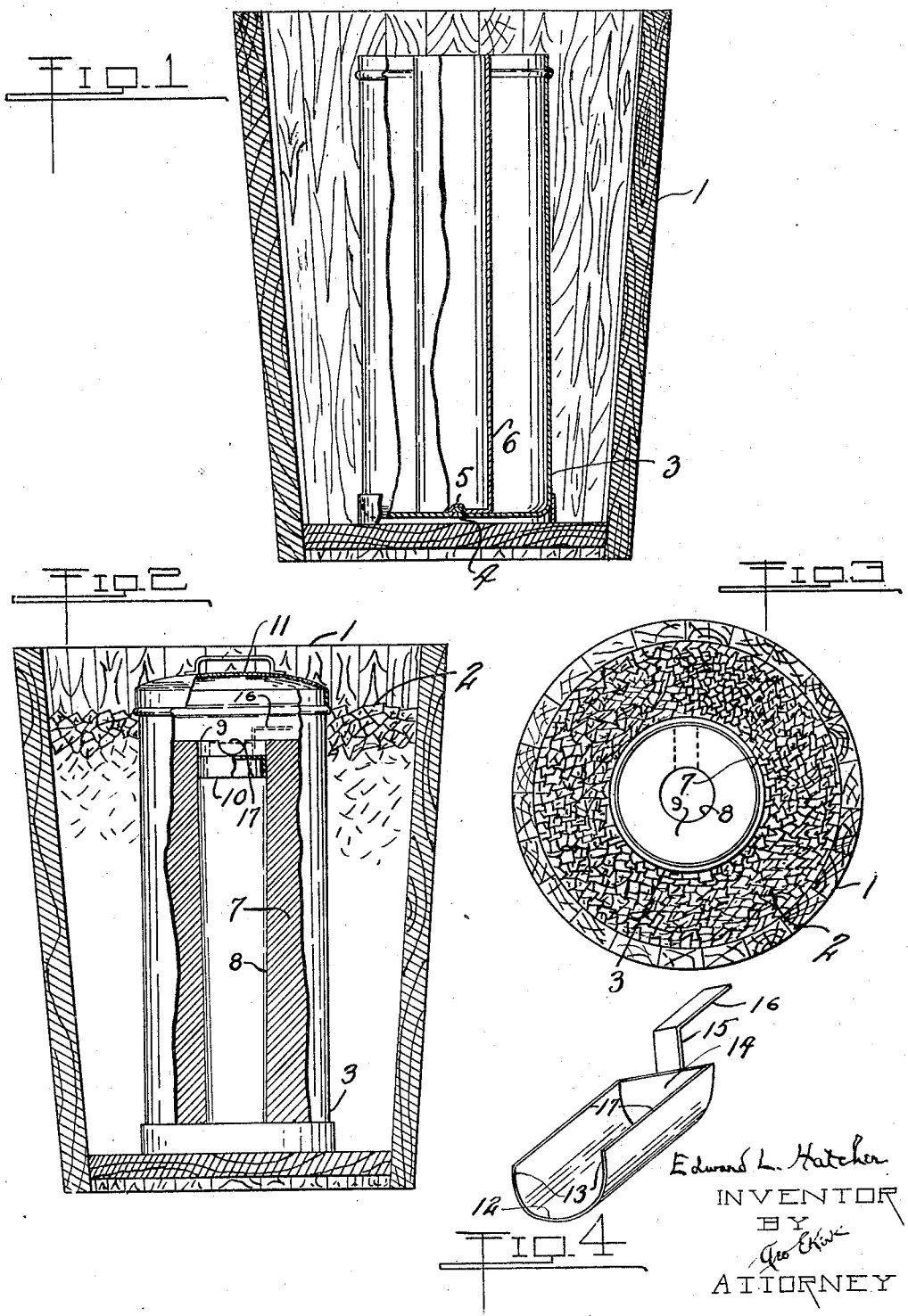

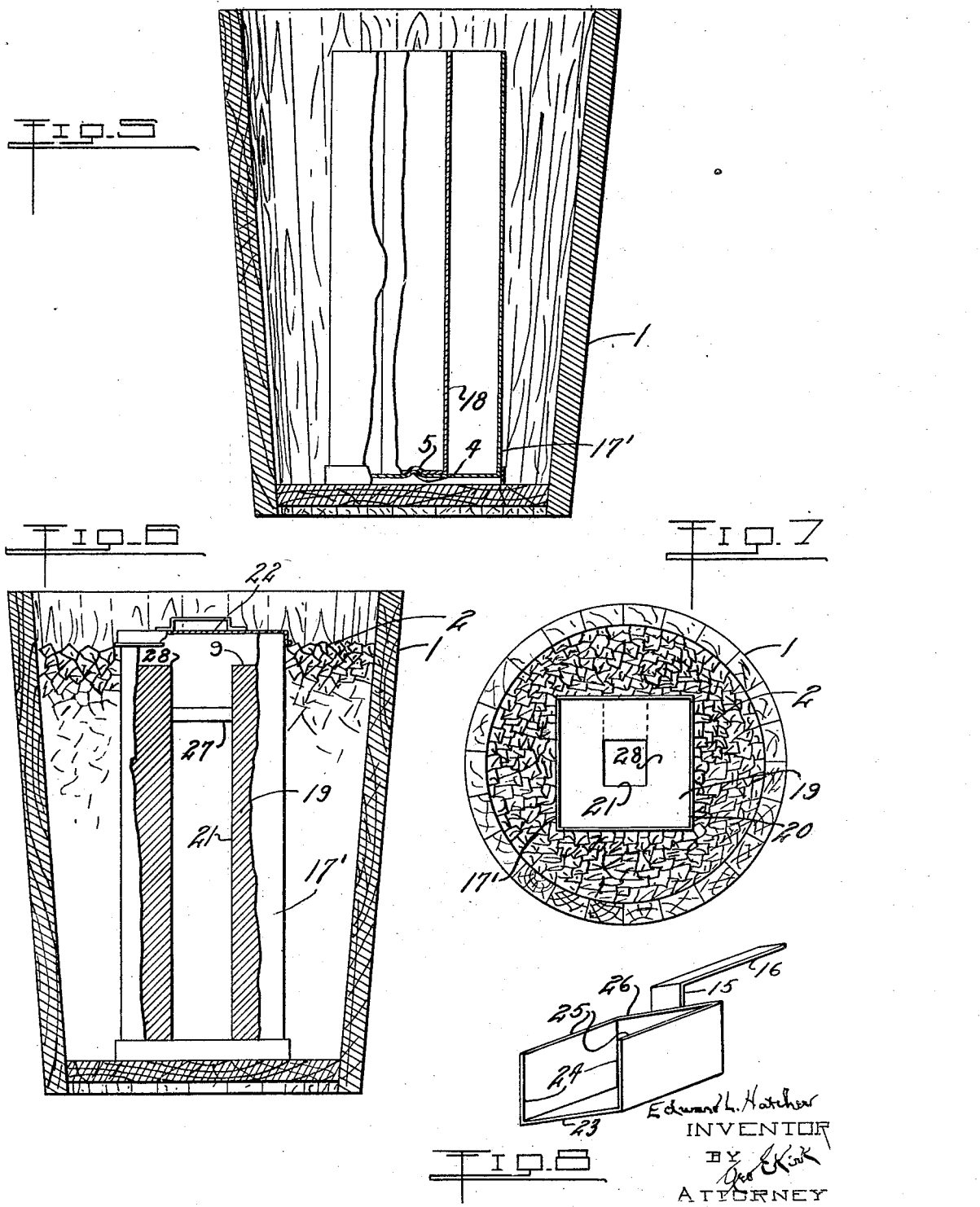

March 24, 1931.  E. L. HATCHER  1,797,417
ICE CREAM DISPENSING
Filed April 17, 1925   3 Sheets-Sheet 3
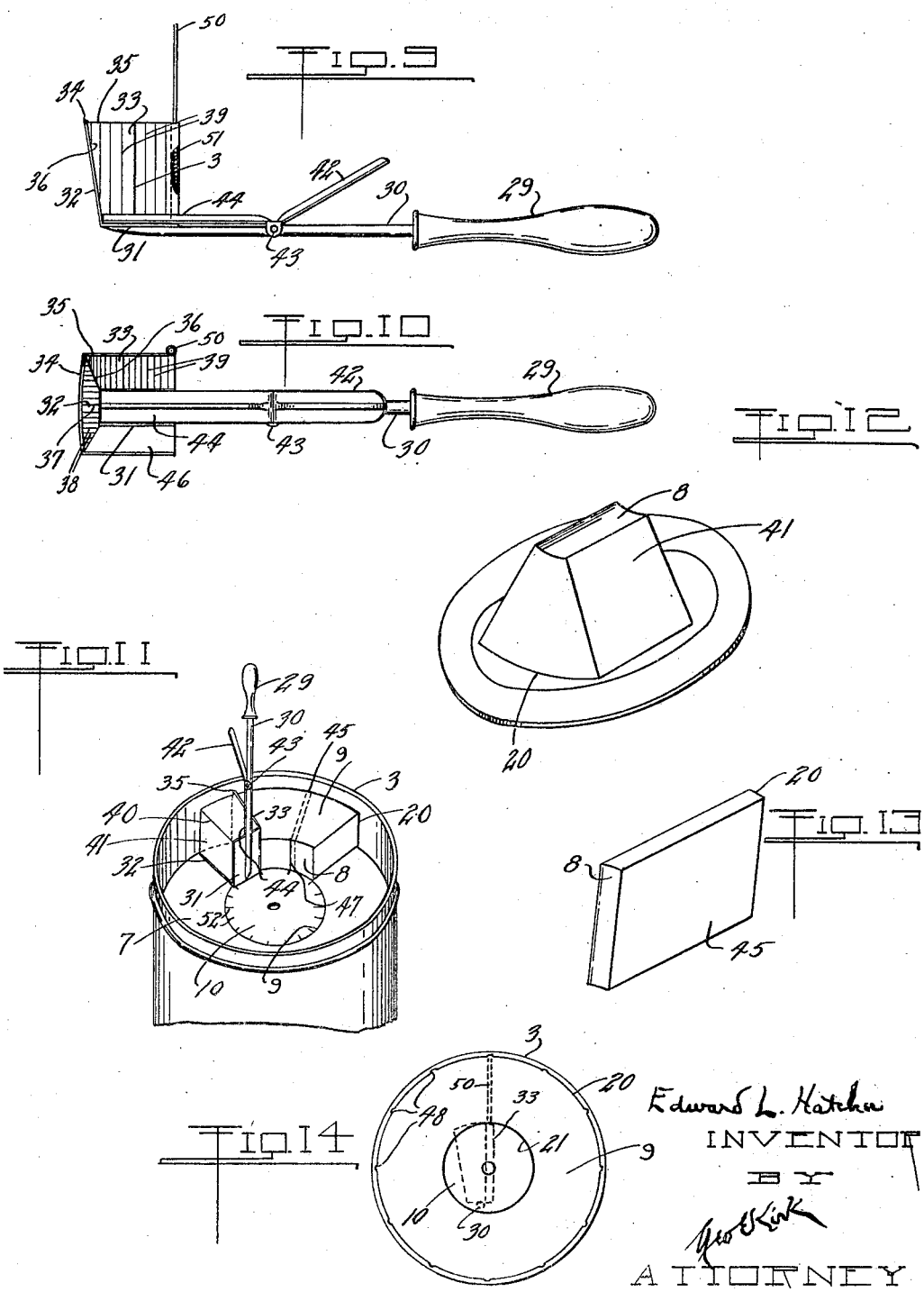

Patented Mar. 24, 1931

1,797,417

UNITED STATES PATENT OFFICE

EDWARD L. HATCHER, OF TIFFIN, OHIO

ICE-CREAM DISPENSING

Application filed April 17, 1925. Serial No. 23,799.

This invention relates to dispensing bulk material, especially when of a shrinkable nature.

This invention has utility when incorporated in connection with solid or semi-sold foods, as ice-cream.

Referring to the drawings:

Fig. 1 is a view, with parts broken away, of an ice-cream holder in accordance with the invention hereof;

Fig. 2 is a view of the holder of Fig. 1, showing, with parts broken away, the adaptation of such holder for dispensing ice-cream therefrom in service portions;

Fig. 3 is a plan view of the container and holder of Fig. 2;

Fig. 4 is a perspective view of the service portion removing tool as adapted to the holder of Fig. 2;

Fig. 5 is a side elevation, with parts broken away, of an ice-cream or ice container and holder;

Fig. 6 is a side elevation, with parts broken away, of the container and holder of Fig. 5, with charge of the food therein, this holder of Figs. 5, 6, being of rectangular form instead of cylindrical form as shown in Figs. 1, 2, 3;

Fig. 7 is a plan view of the container and holder of Fig. 6;

Fig. 8 is a perspective view of the service portion removing tool adapted to the holder of Fig. 6;

Fig. 9 is a detail view of a scoop or dipper especially adapted hereto having an open end and side;

Fig. 10 is a scoop having only an open end and top;

Fig. 11 is a view showing the scoop of Fig. 9 in use;

Fig. 12 is a perspective view of a service section as provided by the scoop hereunder;

Fig. 13 is a perspective view of a sandwich section; and

Fig. 14 is a fragmentary view of a bulk quantity of material to be dispensed hereunder.

Container 1 may be charged with refrigerant, as broken ice 2, in surrounding holder 3 of cylindrical form. Preferably, this holder 3 has at its bottom a central upwardly extending seat 4 as a guide for entering seat 5 of inner tubular portion 6. This holder 3, 6, as assembled is in condition for pouring in the charge of shrinkable food, as ice-cream 7. In practice, such material as poured into this tile forming or tubular mold congeals upon exposure to low temperature. The inner guide portion 6 of this mold may then be withdrawn. This withdrawal of the tube 6 of this mold leaves inner wall 8 unsupported and exposed. Adjacent upper exposed surface 9 of this bulk quantity of ice-cream 7 may be placed partition 10 closing off inner surface 8 of this tubular mold or bulk quantity of material. Cover 11 may complete the housing of the bulk quantity of ice-cream 7 as such is transported from its place of manufacture to the place for separating service portions therefrom.

In the separating of service portions from this bulk quantity of material, the cover 11 may be removed. At this starting position the partition 10 is flush with the exposed end 9 of the material 7. The partition 10 may be depressed along the inner surface 8 the depth of the service portion. This is readily effected in the provision of a tool having lower cutting edge 12, uprising cutting edges 13, extending rearwardly to back 14 from which rises stem 15 having rearwardly extending handle 16. The rise of the sides of this scoop or cutting tool from this bottom portion 12 to the edges 17 as coming to the forward cutting edges 13, determines a depth for the service portion. Accordingly, by disposing the bottom 12 of the tool against the partition 10 and depressing such partition 10 until the edges 17 register with the exposed end 9 of the ice-cream 7, there is determined a gage depth for removal of successive service portions in the common cross-sectional region of the bulk quantity of the food 7.

There is, accordingly, no lowering of temperature along the exposed face 8 when the lid 11 is removed for obtaining service portions.

The service portions are removed by the simultaneous bottom and side cutting in the shifting of the tool radially from the inner unsupported surface 8 toward the outer surface of such ice-cream as supported by the wall of the container 3. This is a cutting in the entire travel, and as the tool comes in contact with the container 3, an upward lift will effect a neat removal of such separated service portion. These radial cuttings may be continuous until the common plane series is all removed. To effect additional removal of the service portions, there is a succeeding depression of the partition 10 to the gage depth as to the exposed end surface which is now rather uneven due to the curved contour of the tool. However, the gage may be so shifted downward that there is approximate uniformity in service portion removal even from the succeeding levels of the gage or partition 10 notwithstanding this unevenness as compared with the smoothness of the original exposed end surface 9. This partition 10 may be of paraffined paper, board, or other substance for single service operation.

Instead of cylindrical holder 3, there may be adopted polygonal or rectangular holder 17' (Figs. 5, 6, 7). This holder 17' is provided with seat 4 to engage projection 5 to thereby register centrally thereof rectangular sleeve or mold forming element 18 as similar to the inner wall forming mold element 6. Resulting bulk quantity 19 of ice-cream is of a rectangular tubular form, both as to its outer surface 20 as well as its inner surface 21. Closure 22 may serve to shield this tubular bulk quantity of ice-cream in transportation to place of service, as well as help to keep out higher temperature between removal of service portions. This type of holder and bulk material is susceptible of having cubic service portions therefrom conveniently removed by tool having bottom 23, adjacent forward cutting edges 24 rising therefrom with rearwardly extending top edges 25 terminating at back 26 from which rises stem 15 for handle 16.

Upon the removal of rectangular inner sleeve 18 as the cast 19 is produced, there is placed partition 27 adjacent upper surface 28 so that when service portions are to be removed, the tool may have its bottom 23 depress this partition 27 until cutting edges 24 register with the exposed end surface 28 of the bulk quantity 19. At this position, the service portions may be removed successively in a common cross-sectional extent of this bulk material until in instance shown eight such quantities are removed. Then for successive service portions, the partition 27 is again depressed and removals occur successively in a similar manner.

Instead of the dippers or scoops of Figs. 4, 8, greater flexibility advantage is had in the adaptation of the tool of Fig. 9. Herein, handle 29 has stem 30 fixed with uprising rear wall 31 from which forwardly extends bottom horizontal wall 32 and at an angle thereto vertical side 33. These sides 32, 33, are shown flat and at 90° from each other terminating remotely from the handle in cutting edges 34, 35, extending from a common point in the meeting line 36 between the sides 32, 33, with the edge 34 curved to conform to the side of the vessel 3. Advantageously on the side 32, is gage line 37 with supplemental gage lines 38. On the side 33 are gage lines 39.

In practice, partition 10 may be depressed a gage distance from upper surface 9 as indicated by the graduations 37 on the side 33. In the instance of cylindrical ice-cream material 7, having cylindrical inner wall 8, the partition 10 may be at the determined gage depression or at a greater step downward. When this stock is cylindrical, the gage line 37 of the side 32 may be placed in registry with cut edge 40 and the side 33 shifted on the diameter of this material 7 to have such gage line 37 follow the cutting edge 40 at the determined gage depth as elected by the graduations 38 or 37 on the side 33. This operation effects a severance upon lifting the handle 29, 30, of service section 41 from the bulk material 7 in segmental form independently of packing or crowding such section. This section in the upward tilting of the handle 29, 30, is slid along the side of the container 3 into fully removed position. The operator may then pull handle portion 42 of a lever as an arm having a fulcrum 43 on the handle and stem 30 thus to operate second lever arm 44 away from the scoop or dipper back 31, thereby shifting the service portion 41 as to the sides 32, 33, of the dipper or scoop in effecting freeing of such service portion therefrom for delivery into a container for serving.

In the instance the service portion is to be smaller as in the production of ice-cream service portion 45, a graduation 38 on the side 32 may be elected at the depth along the side 33 provided for a regular service portion. There is thus possible ice-cream service portions from this bulk material. The dippers may be made right or left hand as to the side 33, from the side 32, or there may be a side 46 opposing the side 33. However, in practice, the single sided structure, with the bottom and back only, precludes crowding or packing of the material and thereby tends to preserve its texture, and in so doing seems to retain full values of flavor and palatability.

In the formation of the bulk quantity of material herein as a tube or cylindrical section, whether polygonal or circular, it is preferably desired to have the mold as leaving the central way or void slightly tapered to permit more ready removal thereof upwardly.

In instances where the bulk material, as ice-cream, is in solid cylindrical cast, boring out thereof may occur to provide a core or central way. This cutting action in forming the inner surface of the core may to some extent as bored out result in a cutting up of the removed material which may be used as spreads or reworked in the event it be considered too crumbled for regular service. In this connection, or even with the cast structure of bulk material, imprint 47 may be made upon the respective levels as reached, as a guide in the operation of the cutting element or scoop. In the rectangular form of polygonal structure, the sides and corners of such outlines may be the gage for full service portions with the depth portion determining the variation in quantity, if there be quantity variation desired. Additionally, the container 3 on its inner surface may have gage marks 48 to guide the user of the cutting tool, scoop, or dipper. Even further refinement may occur by providing bead 49 along the top of side 33 as a guide for stem 50, normally projected by spring 51. Accordingly, this stem 50 as in alignment with the side 35, may determine the diametrical line for thrusting the tool from a guiding indicator or check 52 in the gage disk or partition 10. When the gage lines 48 are used, the remote end of this stem 50 may be in registry with one of such marks.

This invention has exceptional utility in dispensing shrinkable ices and ice-creams. There is no packing or crowding of the bulk quantity in the separation of the service portion therefrom. The cutting is a direct cutting for separating a service portion.

Inasmuch as the usual service is by quantity, the crowding of the material reduces the number of service portions which the dispenser may obtain from a bulk quantity. In practice, this shrinkage runs frequently as much as forty percent. Ice-cream, in usual manufacturing operations, when hardening or setting, expands very materially, and as maintained in its original cold state, the bulk remains constant. Exposure to melting temperatures is a factor in promoting shrinkage. Notwithstanding there is readily available as a gage surface for cutting and as avoiding packing for cutting, the inner surfaces 21, 8, the partition 27 or 10 keeps the major portion of such surface from temperature action and shrinkage therefrom.

It is, accordingly, clear with the gage control of the partition in conjunction with the tool that the dispenser may from a determined bulk quantity of this shrinkable material measure out one-hundred percent in the service portions therefrom. Such is effected neatly with symmetrical service uniformity and with speed in such mode of handling. It is true, the void in the container due to the central way in the bulk quantity in a measure reduces the bulk volume of the material. However, the merchant purchases the bulk quantity, not the hole and is in position to serve his trade equal uniform service portions and have such register out one-hundred percent in the full number of service portions for each level and a determined number of levels in each bulk quantity.

The service portion 41 as placed with the larger portion as a base has general truncated pyramidal section with a trough-like summit in which dope, fruit, and other garnishment is readily retained.

What is claimed and it is desired to secure by Letters Patent is:

1. The method of producing service portions of ice cream which comprises forming a tubular block of ice cream having an opening of substantial width therethru, severing a portion from said block by cutting radially outward from said opening toward the outer side of said block, and removing said severed portion from said block.

2. The method of producing service portions of ice cream which comprises forming a tubular block of ice cream having a cylindrical opening of substantial width therethru, supporting the outer side of said block with a cylindrical container, severing a portion from said block by cutting outward between said opening and the outer side of said block at said container, and removing said severed portion away from said block.

In witness whereof I affix my signature.

EDWARD L. HATCHER.